US012262118B2

(12) United States Patent
Kaji

(10) Patent No.: US 12,262,118 B2
(45) Date of Patent: Mar. 25, 2025

(54) IMAGE PROCESSING DEVICE, IMAGE DISPLAY SYSTEM, METHOD, AND PROGRAM FOR GENERATING A COMPOSITE IMAGE

(71) Applicant: SONY GROUP CORPORATION, Tokyo (JP)

(72) Inventor: Hidetaka Kaji, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 102 days.

(21) Appl. No.: 18/009,887

(22) PCT Filed: Jun. 22, 2021

(86) PCT No.: PCT/JP2021/023548
§ 371 (c)(1),
(2) Date: Dec. 12, 2022

(87) PCT Pub. No.: WO2022/014271
PCT Pub. Date: Jan. 20, 2022

(65) Prior Publication Data

US 2023/0319407 A1 Oct. 5, 2023

(30) Foreign Application Priority Data

Jul. 13, 2020 (JP) ................................ 2020-120063

(51) Int. Cl.
*H04N 23/68* (2023.01)
*G06F 3/01* (2006.01)
(Continued)

(52) U.S. Cl.
CPC ......... *H04N 23/6845* (2023.01); *G06F 3/012* (2013.01); *G06F 3/013* (2013.01);
(Continued)

(58) Field of Classification Search
CPC ............. H04N 23/6845; H04N 23/667; H04N 23/6811; H04N 23/6812; H04N 23/73;
(Continued)

(56) References Cited

U.S. PATENT DOCUMENTS 9,185,291 B1 * 11/2015 Shabtay .............. H04N 23/958

FOREIGN PATENT DOCUMENTS

JP 2002-314873 A 10/2002
JP 2006245909 A 9/2006
(Continued)

*Primary Examiner* — Sinh Tran
*Assistant Examiner* — Angel L Garces-Rivera
(74) *Attorney, Agent, or Firm* — Paratus Law Group, PLLC

(57) ABSTRACT

An image processing device of an embodiment includes a control unit that generates a composite image obtained by combining a first image captured in a first exposure time and having first resolution and a second image that is an image corresponding to a partial region of the first image and is captured in a second exposure time shorter than the first exposure time and having second resolution higher than the first resolution, the first image and the second image being input from an image sensor, and outputs the composite image to a display device.

11 Claims, 12 Drawing Sheets

(51) Int. Cl.

| | |
|---|---|
| ***G06T 3/40*** | (2024.01) |
| ***G09G 3/00*** | (2006.01) |
| ***H04N 23/667*** | (2023.01) |
| ***H04N 23/73*** | (2023.01) |
| ***H04N 23/741*** | (2023.01) |
| ***H04N 23/80*** | (2023.01) |

(52) U.S. Cl.
CPC ............... *G06T 3/40* (2013.01); *G09G 3/001* (2013.01); *H04N 23/667* (2023.01); *H04N 23/6811* (2023.01); *H04N 23/6812* (2023.01); *H04N 23/73* (2023.01); *H04N 23/80* (2023.01); *G09G 2340/10* (2013.01); *H04N 23/741* (2023.01)

(58) Field of Classification Search
CPC .... H04N 23/80; H04N 23/741; H04N 25/443; H04N 25/46; H04N 25/533; H04N 25/589; G06F 3/012; G06F 3/013; G06T 3/40; G06T 3/4038; G06T 19/006; G09G 3/001; G09G 2340/10; G09G 5/00; G09G 5/36; G09G 5/377; G02B 2027/0138; G02B 2027/0147; G02B 27/0093; G02B 27/017
See application file for complete search history.

(56) References Cited

FOREIGN PATENT DOCUMENTS

| | | | |
|---|---|---|---|
| JP | 2013098805 | A | 5/2013 |
| JP | 2016527734 | A | 9/2016 |
| JP | 2016-192137 | A | 11/2016 |
| JP | 2019-029952 | A | 2/2019 |
| WO | WO 2017/187811 | A1 | 11/2017 |

* cited by examiner

IMAGE PROCESSING DEVICE, IMAGE DISPLAY SYSTEM, METHOD, AND PROGRAM FOR GENERATING A COMPOSITE IMAGE

CROSS REFERENCE TO PRIOR APPLICATION

This application is a National Stage Patent Application of PCT International Patent Application No. PCT/JP2021/023548 (filed on Jun. 22, 2021) under 35 U.S.C. § 371, which claims priority to Japanese Patent Application No. 2020-120063 (filed on Jul. 13, 2020), which are all hereby incorporated by reference in their entirety.

FIELD

The present disclosure relates to an image processing device, an image display system, a method, and a program.

BACKGROUND

Conventionally, on the assumption of being mainly used in a video see-through (VST) system, a technology has been proposed in which a region of interest is calculated from a line-of-sight position estimated by an eye tracking system, and processing (resolution conversion processing) of thinning out an image of only a region of non-interest is performed after photographing, in a manner that a processing load on image processing can be reduced.

In the technique described in Patent Literature 1, imaging is performed at different resolutions in a region of interest and a region of non-interest, and the resolution of the region other than the region of interest is reduced, thereby reducing the processing load.

In the technique described in Patent Literature 2, low delay of video see-through is realized by optimizing the camera imaging timing and the displaying timing.

CITATION LIST

Patent Literature

Patent Literature 1: JP 2019-029952 A
Patent Literature 2: JP 2016-192137 A

SUMMARY

Technical Problem

By the way, in the VST system, a high-definition camera is indispensable in order to realize display comparable to reality. However, in order to realize high definition, as pixels become finer, an exposure time becomes longer in order to maintain an exposure condition, blur (so-called imaging blur) occurs due to motion during exposure, and a discrepancy from reality is felt or VR sickness or fatigue is increased.

In addition, a processing delay and a data transfer delay from the camera serving as an input to the display serving as an output cause a positional deviation between the reality and the displaying. This positional deviation also causes an increase in VR sickness and fatigue. For this reason, motion prediction is used to avoid a positional deviation. However, the larger the delay in the system, the higher the prediction failure probability. Therefore, it is important to design the system path with low delay.

Furthermore, in order to display a video see-through video on a display as if a person directly views the video see-through video with his/her eyes, it is desired to achieve both high image quality and low delay.

The present technology has been made in view of such a situation, and an object of the present technology is to provide an image processing device, an image display system, a method, and a program capable of realizing reduction of blur and high definition with low delay while reducing a processing load on image processing.

Solution to Problem

An image processing device of the embodiment includes: when generating a composite image obtained by combining a first image captured in a first exposure time and a second image that is an image corresponding to a partial region of the first image and is captured in a second exposure time shorter than the first exposure time, the first image and the second image being input from an image sensor, a control unit that sets imaging timing of the second image to timing closer to timing of outputting the composite image to a display device than imaging timing of the first image.

DESCRIPTION OF EMBODIMENTS

Hereinafter, embodiments will be described in detail with reference to the drawings.

Figure 1:
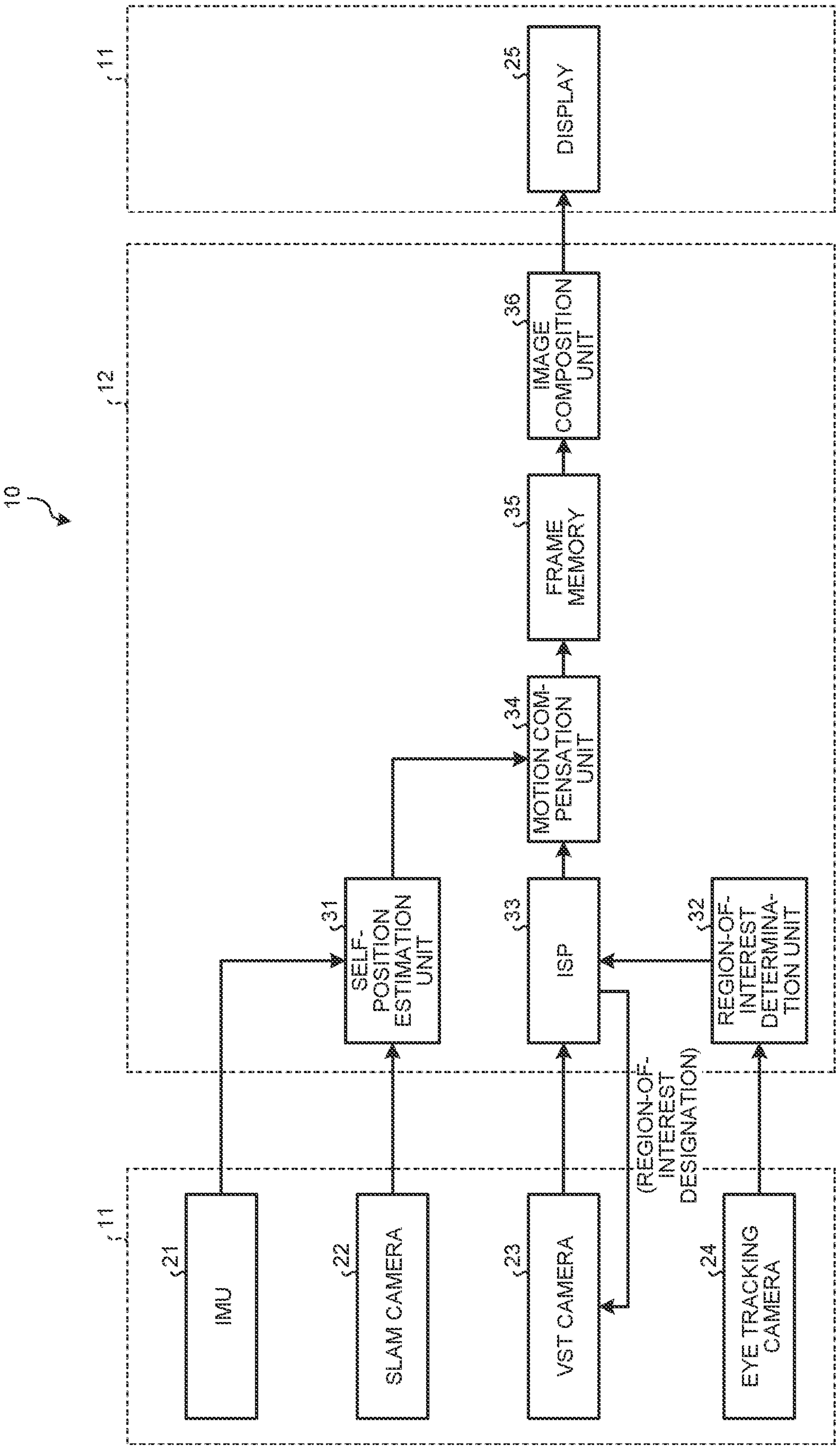
FIG. 1 is a schematic configuration block diagram of a VR head mounted display system according to an embodiment.

FIG. 1 is a schematic configuration block diagram of a VR head mounted display system according to an embodiment.

FIG. 1 illustrates an information processing device connection type VR head mounted display system.

A VR head mounted display system 10 roughly includes a head mounted display (hereinafter, referred to as an HMD unit) 11 and an information processing device (hereinafter, referred to as a PC unit) 12.

Here, the PC unit 12 functions as a control unit that controls the HMD unit 11. In addition, data is transferred between the HMD unit 11 and the PC unit 12 by using the communication function of each unit, but this is not related to the description of the present technology, and thus is omitted.

The HMD unit 11 includes an inertial measurement unit (IMU) 21, a simultaneous localization and mapping (SLAM) camera 22, a video see-through (VST) camera 23, an eye tracking camera 24, and a display 25.

The IMU 21 is a so-called motion sensor, senses a user's state and the like, and outputs a sensing result to the PC unit 12.

The IMU 21 includes, for example, a three-axis gyro sensor and a three-axis acceleration sensor, and outputs user's motion information (sensor information) corresponding to the detected three-dimensional angular velocity, acceleration, and the like to the PC unit 12.

Figure 2:
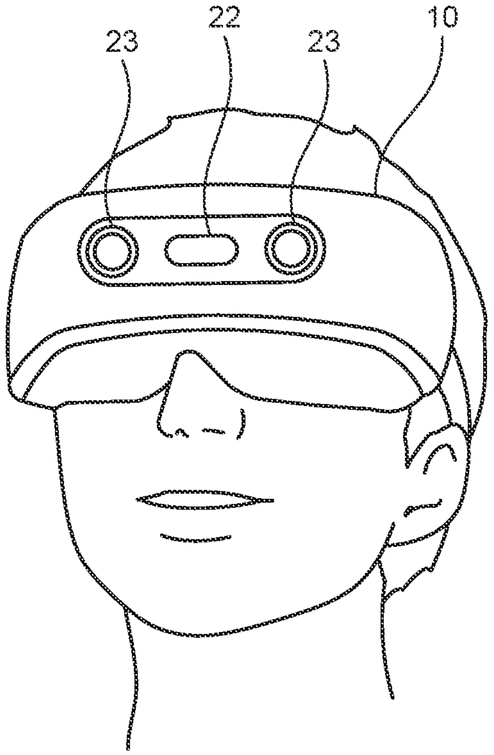
FIG. 2 is an explanatory diagram of a VR head mounted display system illustrating an arrangement state of cameras.

FIG. 2 is an explanatory diagram of a VR head mounted display system illustrating an arrangement state of cameras.

The SLAM camera 22 is a camera that simultaneously performs self-position estimation called SLAM and environmental map creation, and acquires an image for use in a technique for obtaining a self-position from a state in which there is no prior information such as map information. The SLAM camera is arranged, for example, at the central portion of the front surface of the HMD unit 11, and collects information for simultaneously performing self-position estimation and environmental map creation 15 based on a change in an image in front of the HMD unit 11. The SLAM will be described in detail later.

The VST camera 23 acquires a VST image, which is an external image, and outputs the VST image to the PC unit 12.

Figure 3:
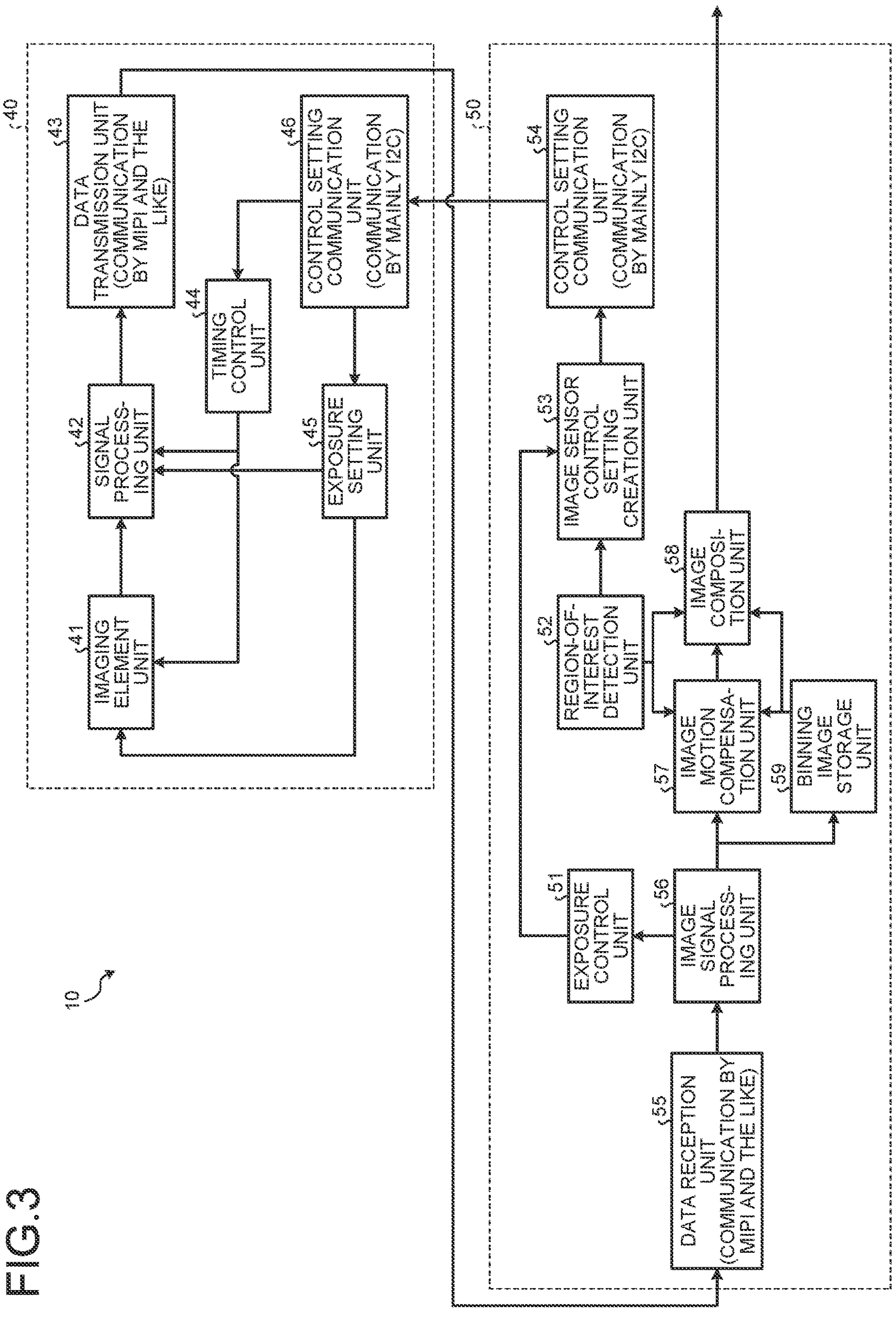
FIG. 3 is a functional block diagram of a VST camera according to the embodiment.

The VST camera 23 includes a lens installed outside the HMD unit 11 for VST and an image sensor 23A (see FIG. 3). As illustrated in FIG. 2, a pair of VST cameras 23 is provided to correspond to the positions of both eyes of the user.

In this case, imaging conditions (resolution, imaging region, imaging timing, and the like) of the VST camera 23 and thus the image sensor are controlled by the PC unit 12.

The image sensor 23A (see FIG. 3) included in the VST camera 23 according to the present embodiment has, as operation modes, a full resolution mode having a high resolution but a high processing load, and a pixel addition mode having a low resolution but a low processing load.

Then, the image sensor 23A can switch between the full resolution mode and the pixel addition mode in units of frames under the control of the PC unit 12.

In this case, the pixel addition mode is one of the drive modes of the image sensor 23A, and random noise for each pixel is stochastically reduced by averaging, in a manner that an image with less noise is obtained as compared with the full resolution mode.

Specifically, in the 2×2 addition mode as an example of the pixel addition mode, 2×2 pixels in the vertical and horizontal directions (four pixels in total) are averaged and output as one pixel, in a manner that an image with a resolution of 1/4 and a noise amount of about 1/2 is output. Similarly, in the 4×4 addition mode, 4×4 pixels in the vertical and horizontal directions (16 pixels in total) are averaged and output as one pixel, in a manner that an image with a resolution of 1/16 and a noise amount of about 1/4 is output.

The eye tracking camera 24 is a camera for tracking the user's line of sight, so-called eye tracking. The eye tracking camera 24 is configured as an external visible light camera and the like.

The eye tracking camera 24 is used to detect a region of interest of the user required by a method such as variable foveated rendering. According to the recent eye tracking camera 24, the line-of-sight direction can be acquired with accuracy of about ±0.5°.

The display 25 is a display device that displays an image processed by the PC unit 12.

The PC unit 12 includes a self-position estimation unit 31, a region-of-interest determination unit 32, an image signal processor (ISP) 33, a motion compensation unit 34, a frame memory 35, and an image composition unit 36.

The self-position estimation unit 31 estimates the self-position including the posture of the user and the like based on the sensor information output by the IMU 21 and the SLAM image acquired by the SLAM camera 22.

In the present embodiment, as a method of self-position estimation of the self-position estimation unit 31, a method of estimating the three-dimensional position of the HMD unit 11 using both the sensor information output by the IMU 21 and the SLAM image acquired by the SLAM camera 22 is used. However, some methods such as visual odometry (VO) using only a camera image and visual inertial odometry (VIO) using both the camera image and the output of the IMU 21 can be considered.

The region-of-interest determination unit 32 determines the region of interest of the user based on the eye tracking result image of both eyes, which is the output of the eye tracking camera 24, and outputs the region of interest to the ISP 33.

The ISP 33 performs image processing only on the region of interest in the imaging region of the VST camera 23 or performs image processing on the entire region based on the region of interest of the user determined by the region-of-interest determination unit 32.

In addition, the ISP 33 processes the image signal output from the VST camera 23 and outputs the processed image signal. Specifically, as the processing of the image signal, "noise removal", "demosaic", "white balance", "exposure adjustment", "contrast enhancement", "gamma correction", and the like are performed. Since the processing load is large, dedicated hardware is basically prepared in many mobile devices.

The motion compensation unit 34 performs motion compensation on the processed image signal based on the position of the HMD unit 11 estimated by the self-position estimation unit 31, and outputs the processed image signal.

The frame memory 35 stores the processed image signal after motion compensation in units of frames.

First, prior to detailed operation description of the embodiment, a principle of the embodiment will be described.

In a case where a high-resolution wide-angle camera is used as the VST camera 23, the resolution is different between the center and the periphery due to the influence of lens distortion.

In addition, in a case where an image is focused so much that blur is noticeable, it is known that the recognition limit is about 20° for characters and about 60° for symbols around the visual axis. That is, it is known that the influence of blur has space dependence centered on the line of sight of a person viewing an image as a user.

Therefore, using the sense of resolution of the VST camera 23 or the space dependence centered on the line of sight of a person, a region close to the center with the center of the screen as the center in the former case and the visual axis as the center in the latter case is set as the region of interest.

Then, for the region of interest, one second image captured in a predetermined exposure time with which blurring hardly occurs is acquired.

On the other hand, for a region other than the region of interest, one or a plurality of first images is acquired in which the resolution is reduced (reduced by binning) and the exposure is adjusted in a manner that the image quality becomes appropriate by capturing the entire imaging region.

The first image obtained by binning has less noise than the image without binning. In addition, in the binning imaging (first image), the exposure control is performed such that the exposure time is longer than that in the imaging of only the region of interest, in a manner that it is not necessary to use the digital gain. Therefore, there is also an advantage that an image having a high dynamic range and a good S/N ratio but a low resolution is easily obtained.

Then, in the region of interest, a first image having a good S/N ratio and a high dynamic range and a second image having a high resolution and less likely to blurring are combined to generate an image with improved image quality.

As a result, according to the present embodiment, an image in which occurrence of blur is suppressed at a high resolution is displayed as a VST image on the display for the region of interest, and an image having a good S/N ratio and a high dynamic range but a low resolution is displayed as a VST image for the regions other than the region of interest.

Furthermore, in the present embodiment, the control is performed in a manner that the delay until the display timing of the region of interest on the display is minimized by adjusting the timing to match the photographing of the region of interest (photographing of the second image) with the display timing on the display or by switching the imaging order.

Therefore, the region of interest can be displayed with a low delay in the video see-through, and an image with a higher sense of immersion can be displayed.

Next, a functional block diagram of the embodiment will be described.

FIG. 3 is a functional block diagram of VST processing representing from the VST camera to image composition according to the embodiment.

The VST processing roughly includes an image sensor 40 and an image processing system 50.

The image sensor 40 only needs to be able to switch between binning imaging and cutout imaging of the region of interest without a frame invalid period.

The image sensor 40 roughly includes an imaging element unit 41, a signal processing unit 42, a data transmission unit 43, a timing control unit 44, an exposure setting unit 45, and a control setting communication unit 46.

The imaging element unit 41 converts light into a charge in the entire or specific region of the imaging region in a designated range and outputs the charge as an imaging signal.

The signal processing unit 42 performs binning processing, gain processing, or A/D conversion processing on the imaging signal input from the imaging element unit, and outputs the imaging signal as imaging data.

The data transmission unit 43 outputs the imaging data output by the signal processing unit to the image processing system.

The timing control unit 44 generates and outputs an imaging timing in the imaging element unit or a timing of various types of signal processing in the signal processing unit.

The exposure setting unit 45 sets appropriate exposure for the imaging element unit or the signal processing unit.

The control setting communication unit 46 mainly performs communication by I2C and outputs the control setting input from the image processing system to the timing control unit or the exposure setting unit.

Here, the binning processing performed by the signal processing unit 42 will be described.

In the binning processing, the same colors are averaged by an analog signal or digital data with respect to the imaging element corresponding to each pixel constituting the imaging element unit.

Figure 4:
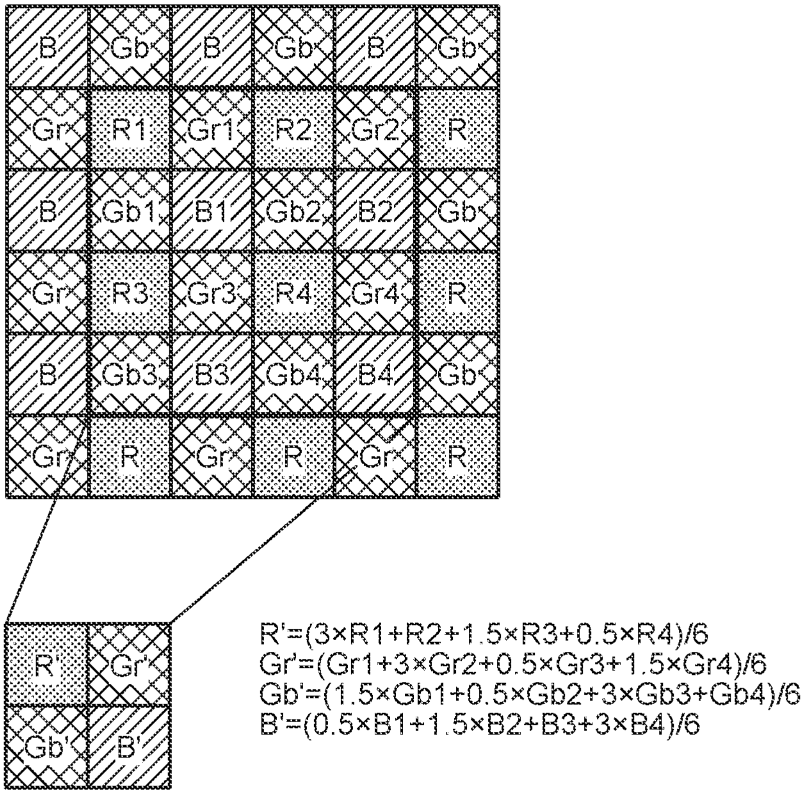
FIG. 4 is an explanatory diagram of a binning processing.

FIG. 4 is an explanatory diagram of a binning processing.

In general, when color filters are arranged in a line called a Bayer array, the same colors are averaged.

The example of FIG. 4 is a case where binning processing is performed on a 4×4 pixel image and a 2×2 pixel image.

In this case, as illustrated in FIG. 4, addition weighting may be performed according to the position of the pixel.

Specifically, the value of a pixel R' after the binning processing is expressed by, for example, the following formula using the values of four pixels R1 to R4 before the binning processing.

$$R'=(3\times R1+R2+1.5\times R3+0.5\times R4)/6$$

Alternatively, addition may be performed evenly. Specifically, it is expressed as the following formula.

$$R'=(R1+R2+R3+R4)/4$$

Then, an image obtained by performing the averaging processing on all the pixels is called a binning image.

In the present embodiment, a binning image corresponding to the first image is used as an image outside the region of interest.

Furthermore, in the present embodiment, in the binning image, an image portion corresponding to the region of interest is used to perform image composition with an image captured in an exposure time in which blurring inside the region of interest hardly occurs (corresponding to a second image and hereinafter referred to as a blur-reduced image). Details of the image composition will be described later.

Next, the image processing system 50 will be described.

The image processing system 50 roughly includes an exposure control unit 51, a region-of-interest detection unit 52, an image sensor control setting creation unit 53, a control setting communication unit 54, a data reception unit 55, an image signal processing unit 56, an image motion compensation unit 57, an image composition unit 58, and a binning image storage unit 59.

The exposure control unit 51 performs exposure control of the image sensor.

The region-of-interest detection unit 52 detects the region of interest of the user in the captured image based on the line-of-sight information and the like.

The image sensor control setting creation unit 53 calculates a control condition to be set in the image sensor based on the exposure control information acquired from the exposure control unit and the detection result of the region-of-interest detection unit.

The control setting communication unit 54 mainly performs communication by I2C and transmits the set control setting to the image sensor side.

The data reception unit 55 receives the imaging data transmitted by the data transmission unit of the image sensor.

The image signal processing unit 56 develops the received imaging data, and outputs the developed imaging data to the image motion compensation unit 57 and the binning image storage unit 59.

As a result, the binning image storage unit 59 stores the binning image for image composition and motion compensation, and outputs the binning image to the image motion compensation unit 57 or the image composition unit 58 as necessary. The binning image storage unit 59 corresponds to the frame memory 35 of FIG. 1.

The image motion compensation unit 57 functions as the motion compensation unit 34, and performs image motion compensation to perform motion compensation by moving an image to be captured to a position for displaying based on a processing delay from imaging to displaying and motion information of an imaging object estimated from a plurality of captured images.

Here, a method of motion compensation executed by the image motion compensation unit 57 will be described.

As a motion compensation method, a motion vector based on an image difference of an imaging object obtained by an optical flow algorithm such as the Lucas Kanade method or a pixel value difference minimum search algorithm used in moving image compression is used. Then, based on the motion vector, a position at which the imaging object will be moving from the displaying time to that time is estimated.

Then, this is realized by shifting the camera image displayed on the display to a position corresponding to the estimated display position of the imaging object.

In this case, the motion information of the user obtained from the angular velocity output from the gyro sensor may be used as an auxiliary for the motion compensation. In the optical flow algorithm and the pixel value difference minimum search algorithm, there is a case where a motion vector estimated to be erroneous in an intermittent manner is derived. Therefore, this is effective for removing the motion vector.

More specifically, in a case where the motion vector is detected by the gyro sensor, the similarity is calculated from the angle between the motion vector based on the image difference of the surrounding motion vector detection target (=one pixel or a plurality of pixels) calculated by the above-described algorithm and the motion vector calculated from the angular acceleration output from the gyro sensor. That is, the closer the orientations of the two vectors are, the higher the similarity is, and the more different the orientations of the two vectors are, the lower the similarity is.

Then, by replacing a motion vector based on an image difference that is different in an intermittent manner when the calculated similarity exceeds a predetermined threshold with a motion vector calculated from the gyro sensor, a motion vector estimated to be erroneous can be removed.

Figure 5:
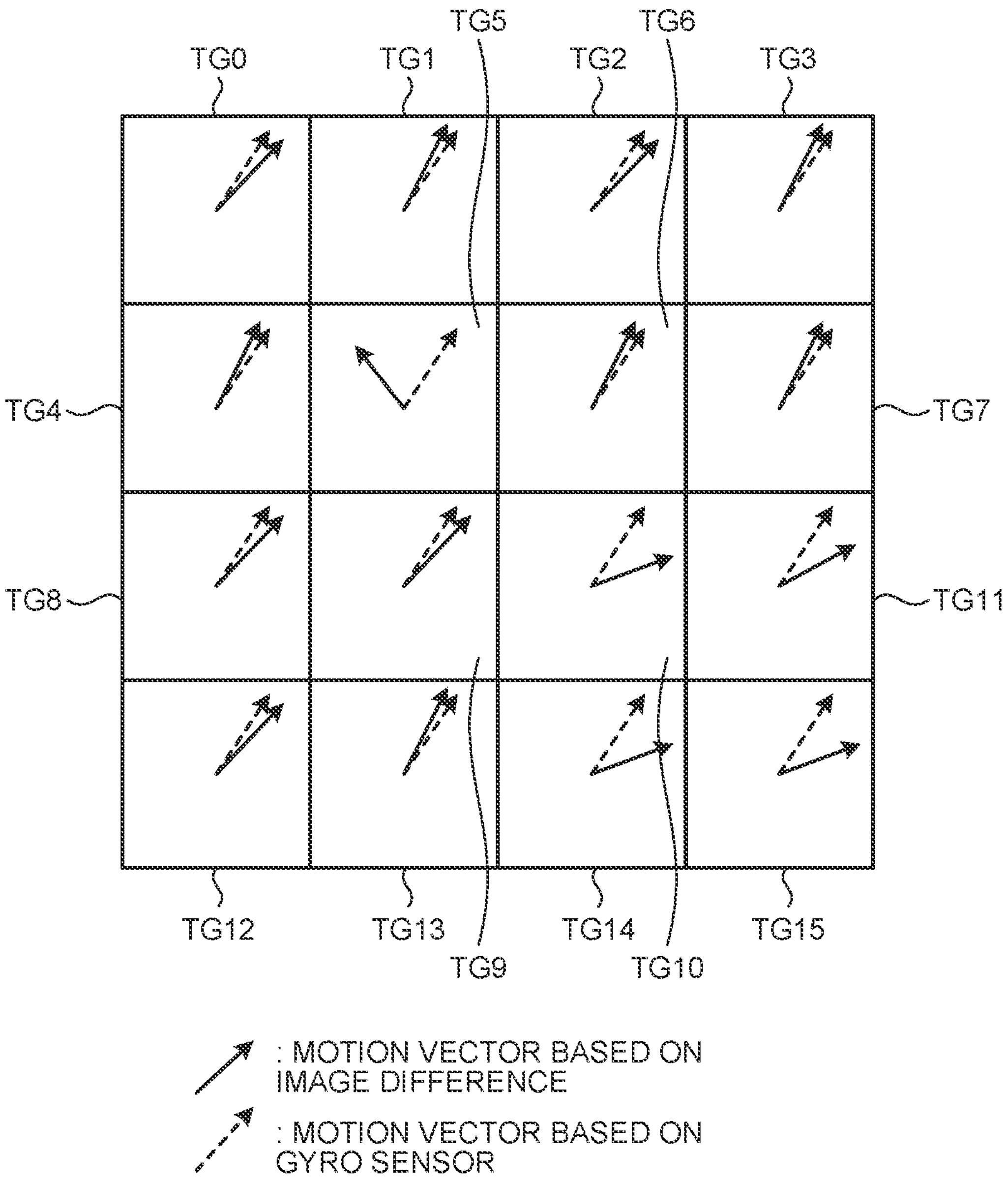
FIG. 5 is an explanatory diagram of removal of a motion vector estimated to be erroneous.

FIG. 5 is an explanatory diagram of removal of a motion vector estimated to be erroneous.

As illustrated in FIG. 5, motion vector detection targets TG1 to TG15 include one pixel or a plurality of pixels.

For each of the motion vector detection targets TG1 to TG15, a motion vector is calculated by an optical flow algorithm, a pixel value difference minimum search algorithm, and the like based on an image difference.

Similarly, a motion vector calculated from the angular acceleration output from the gyro sensor is calculated for each of the motion vector detection targets TG1 to TG15.

Then, for example, for motion vector detection targets TG0 to TG4, TG6 to TG9, TG12, and TG13, since a difference in the orientations (angle difference) between the motion vector based on the image difference and the motion vector calculated from each acceleration is small, it is determined that the similarity is high.

On the other hand, since the motion vector detection targets TG5, TG10, TG11, TG14, and TG15 have a large difference in the orientations (angle difference) between the motion vector based on the image difference and the motion vector calculated from each acceleration, it is determined that there is no similarity.

In this case, when the motion vector detection target TG5 is focused, it is determined that the seven motion vector detection targets TG0 to TG4, TG6, TG8, and TG9 excluding the motion vector detection target TG10 among the eight surrounding motion vector detection targets TG0 to TG4, TG6, and TG8 to TG10 have similarity.

Therefore, the motion vector detection target TG5 determines that a motion vector that is incorrect in an intermittent manner is calculated.

As a result, the motion vector of the motion vector detection target TG5 is set as a motion vector calculated from the angular acceleration output from the gyro sensor.

On the other hand, the motion vector detection targets TG10, TG11, TG14, and TG15 include three or more motion vectors having no similarity among the surrounding motion vector detection targets, and thus, can determine that a moving object different from the own motion is shown.

If there is a motion vector calculated from the angular acceleration output from the gyro sensor as described above, it is possible to remove a motion vector incorrectly calculated and obtain a more correct motion vector.

The image composition unit 58 combines the binning image and the image cut out from the region of interest to hold the contour of the region of interest from the image subjected to the image signal processing and the image motion compensation and the exposure condition, and outputs the binning image subjected to the image signal processing and the motion compensation as it is for the area outside the region of interest.

Here, image composition will be described.

In the image composition, the blur-reduced image and the binning image in which the exposure is adjusted in a manner that the binning processing and the image quality are appropriate are combined in the region of interest.

In this case, since the S/N ratio is effectively improved and the use of the digital gain is stopped in the binning processing, the effective dynamic range of the combined image is wider than that of the image in which the full pixel reading is performed.

Furthermore, by superimposing images captured at different times after the above-described motion compensation is performed, an effect of reducing random noise of the image sensor as a motion-adaptive noise removal filter can be expected.

Figure 6:
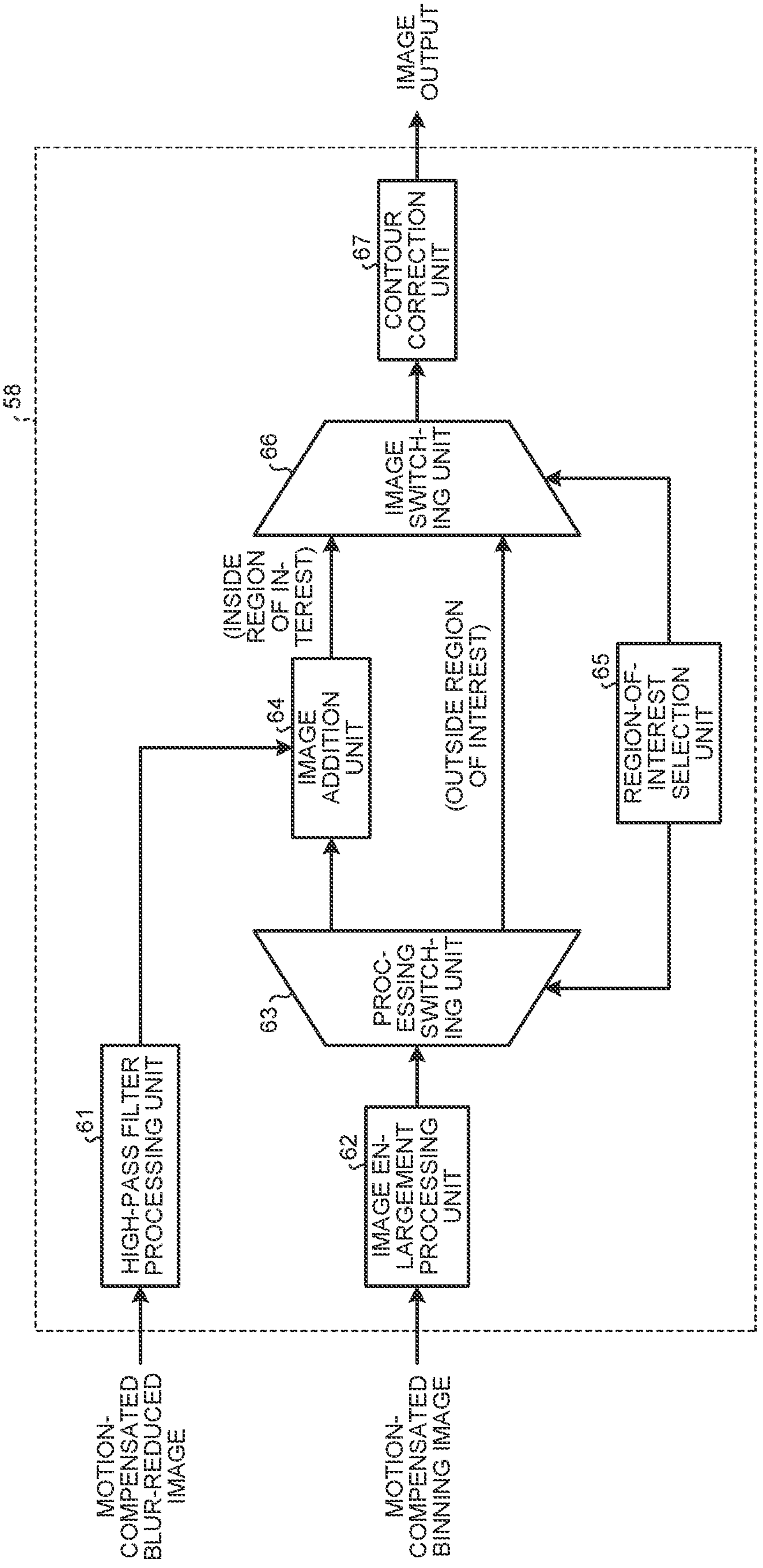
FIG. 6 is a functional block diagram of an image composition unit.

FIG. 6 is a functional block diagram of an image composition unit.

The image composition unit 58 roughly includes a high-pass filter processing unit 61, an image enlargement processing unit 62, a processing switching unit 63, an image addition unit 64, a region-of-interest selection unit 65, an image switching unit 66, and a contour correction unit 67.

Then, in the image composition unit 58, as illustrated in FIG. 6, the high-pass filter processing unit 61 extracts a high-frequency component for performing edge enhancement on the image of the region of interest that is the motion-compensated blur-reduced image.

On the other hand, the image enlargement processing unit 62 enlarges the motion-compensated binning image to have the same resolution as that before the binning processing.

Then, among the enlarged binning images, an image corresponding to the region of interest is output to the image addition unit 64 by the processing switching unit 63 under the control of the region-of-interest selection unit 65.

Then, the blur-reduced image output from the high-pass filter processing unit 61 is added by the image addition unit 64 and output to the image switching unit 66.

As a result, it is possible to maintain the resolution of the region of interest high and secure a large dynamic range.

On the other hand, among the enlarged binning images, an image corresponding to a region other than the region of interest is output as it is to the image switching unit 66 by the processing switching unit 63 under the control of the region-of-interest selection unit 65.

Under the control of the region-of-interest selection unit 65, the image switching unit 66 outputs any image data to the contour correction unit 67 based on whether the display target is the region of interest or a region other than the region of interest.

Therefore, an image obtained by enlarging the binning image is used for an image corresponding to a region other than the region of interest.

Then, the contour correction unit 67 sharpens and outputs the contour of the input image.

By the way, in order to perform image composition to improve image quality, it is necessary to perform HDR processing and resolution enhancement processing at the time of image composition.

As a basic idea of the HDR processing, images are combined in a manner that a blending ratio of a long-exposure image (binning images BG1 and BG2 in the present embodiment) is high in a low-luminance region in a screen, and images are combined in a manner that a blending ratio of a short-exposure image (blur-reduced image BL in the present embodiment) is high in a high-luminance region.

As a result, it is possible to generate an image as if photographed by a camera having a wide dynamic range, and it is possible to suppress an element that hinders a sense of immersion such as blown-out highlights and crushed shadows.

Hereinafter, the HDR processing will be described in more detail.

First, range matching and bit expansion are performed on an enlarged binning image and a blur-reduced image obtained by enlarging the binning image to have the same resolution as that of the blur-reduced image. This is because the luminance ranges are made to coincide with each other and a band is secured along with the expansion of the dynamic range.

Subsequently, an a map representing the luminance distribution in units of pixels is generated for each of the enlarged binning image and the blur-reduced image.

Then, based on the luminance distribution corresponding to the generated $\alpha$ map, $\alpha$ blending for combining the enlarged binning image and the blur-reduced image is performed.

More specifically, in the low-luminance region, based on the generated $\alpha$ map, images are combined in units of pixels in a manner that the blending ratio of the enlarged binning image which is the long-exposure image is higher than the blending ratio of the blur-reduced image which is the short-exposure image.

Similarly, in the high-luminance region, based on the generated $\alpha$ map, images are combined in units of pixels in a manner that the blending ratio of the blur-reduced image which is the short-exposure image is higher than the blending ratio of the enlarged binning image which is the long-exposure image.

Subsequently, since there is a portion where the gradation change is rapid in the combined image, gradation correction is performed in a manner that the gradation change becomes natural, that is, the gradation change becomes gentle.

As a result, a natural, wide dynamic range, and high-definition image can be obtained.

Here, setting of the imaging timing in the present embodiment will be described.

First, imaging timing in the prior art will be described.

Figure 7:
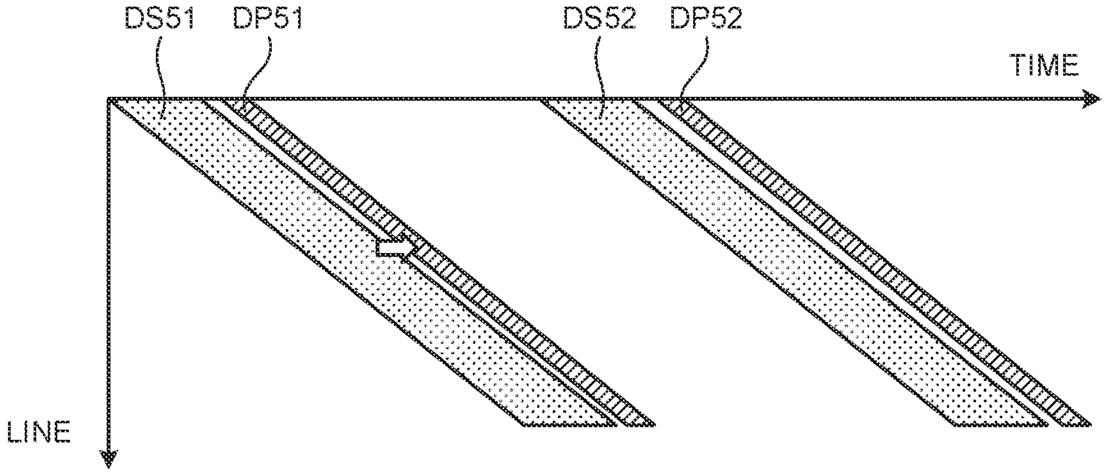
FIG. 7 is an explanatory diagram of an example of conventional imaging timing.

FIG. 7 is an explanatory diagram of an example of conventional imaging timing.

FIG. 7 illustrates the technique described in Patent Literature 2, where the horizontal axis represents time and the vertical axis represents a line.

Then, the horizontal widths of the camera exposure timings DS51 and DS52 represent the exposure time.

In addition, the horizontal widths of displaying timings DP51 and DP52 represent the display update time.

As illustrated in FIG. 7, the time required for capturing one line by the camera and displaying one line on the display is made substantially the same.

Furthermore, timing adjustment is performed to minimize the time for image processing and image data transfer performed until the camera images acquired at the camera exposure timings DS51 and DS52 are displayed at the displaying timings DP51 and DP52.

As a result, the difference in positions between the imaging object included in the image captured by the VST camera 23 displayed on the display 25 and the actual imaging object is minimized.

However, in a case where displaying is realized using an image acquired by one-time camera imaging, there is a high possibility that blurring occurs.

Specifically, for example, an exposure time suitable for a high-resolution camera in an indoor illuminance environment of about 100 to 200 lux is often an exposure time at which blurring occurs.

Figure 8:
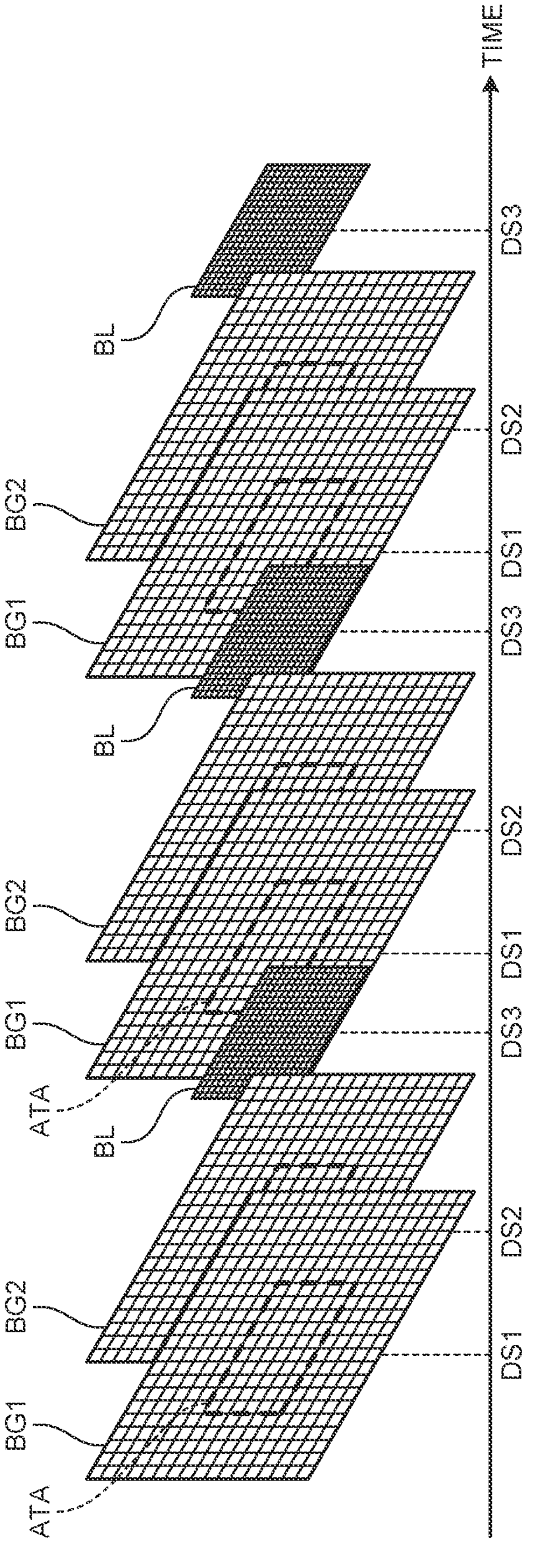
FIG. 8 is an explanatory diagram of imaging timing according to the embodiment.

FIG. 8 is an explanatory diagram of imaging timing according to the embodiment.

Therefore, in the present embodiment, as illustrated in FIG. 8, although the resolution is reduced by binning, acquisition of one or more (in FIG. 8, two) binning images BG1 and BG2 by one or more times of imaging (in FIG. 8, two times) in which the entire imaging region is imaged, and acquisition of one blur-reduced image BL by one time of imaging in which the imaging region is limited only to the region of interest are alternately performed.

In FIG. 8, similarly to FIG. 7, the horizontal axis represents time, and the vertical axis represents a line.

In FIG. 8, during a processing period of one frame, there is two or one imaging timing of a binning image that can be used as an image of a region other than the region of interest and has a low resolution but can be imaged with a high SN ratio and a high dynamic.

More specifically, FIG. 8 illustrates a processing period of a frame capable of imaging two times, that is, camera exposure timing DS1 and camera exposure timing DS2.

In this case, in a processing period of a frame capable of imaging two times, in a case where an image of a region other than the region of interest is displayed, imaging data temporally closer to the displaying timing is used for actual display.

In addition, during the processing period of one frame, there is one imaging timing of the blur-reduced image BL that can be captured with high resolution in the exposure time in which blurring hardly occurs in a manner that it can be used as the image of the region of interest.

More specifically, in FIG. 8, for example, it is camera exposure timing DS3.

Figure 9:
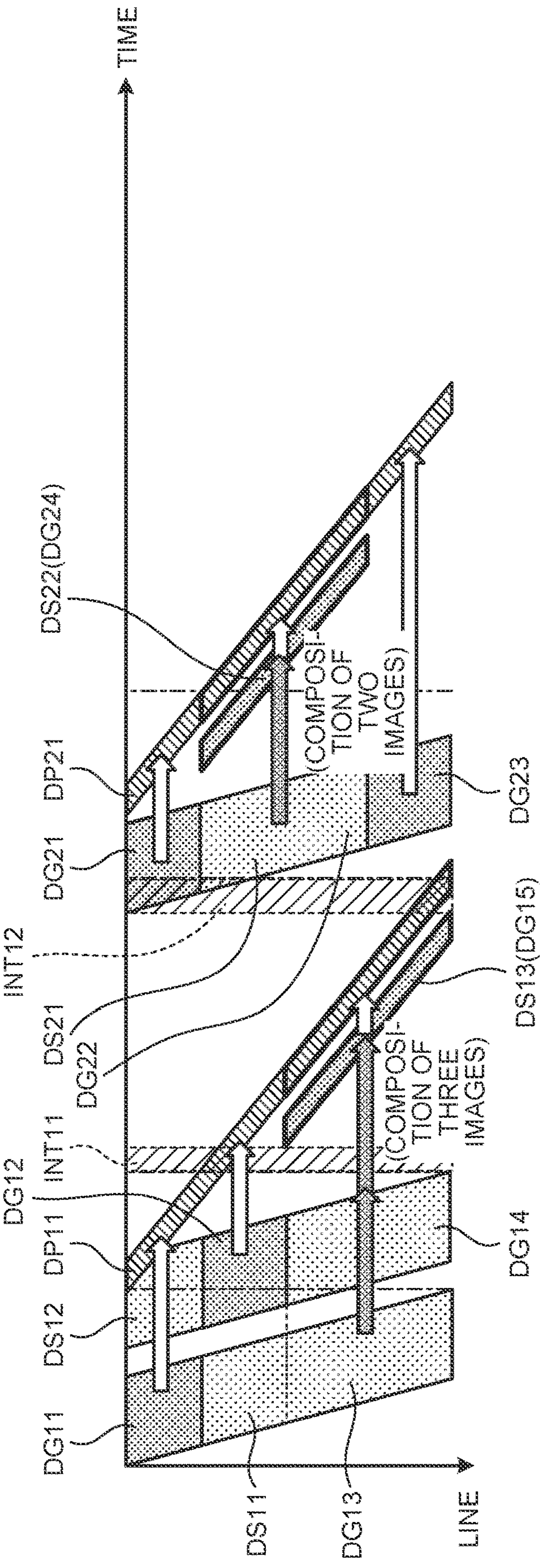
FIG. 9 is an explanatory diagram of more specific imaging timing of the embodiment.

FIG. 9 is an explanatory diagram of more specific imaging timing of the embodiment.

In FIG. 9, similarly to FIG. 7, the horizontal axis represents time, and the vertical axis represents a line.

As illustrated in FIG. 9, at the displaying timing DP11, while the imaging data acquired at camera exposure timing DS12 is not in time for displaying at the displaying timing DP11, an imaging data group DG11 acquired at camera exposure timing DS11 performs display.

At the displaying timing DP11, after the imaging data acquired at camera exposure timing DS12 is in time for displaying at the displaying timing DP11, an imaging data group DG12 acquired at the camera exposure timing DS12 performs display.

Then, at the displaying timing DP11, when the display timing of the displayed region of interest is reached, imaging data groups of three images corresponding to an imaging data group DG15 acquired at camera exposure timing DS13 corresponding to the region of interest, an imaging data group DG13 acquired at the camera exposure timing DS11, and an imaging data group DG14 acquired corresponding to camera exposure timing DS14 are combined and displayed.

In this case, image correction is performed in a manner that the image quality of the captured image of the region of interest and the image quality of the captured image outside the region of interest do not have a feeling of strangeness, and then combining is performed.

In addition, at displaying timing DP21, display is performed by an imaging data group DG21 acquired at camera exposure timing DS21.

When the displaying by the imaging data group DG21 ends at displaying timing DP21 and the displaying timing of the displayed region of interest is reached, two images corresponding to an imaging data group DG22 acquired at the camera exposure timing DS21 and an imaging data group DG24 acquired at the camera exposure timing DS22 are combined and displayed.

Furthermore, image correction is performed in a manner that the image quality of the captured image of the region of interest and the image quality of the captured image outside the region of interest do not have a feeling of strangeness, and then combining is performed.

Then, when the display of the composite image corresponding to the region of interest ends, display is performed by an imaging data group DG23 acquired at the camera exposure timing DS21.

As described above, since the imaging timing of the blur-reduced image, which is the second image, is timing closer to the timing of outputting the composite image to the display device than the imaging timing of the binning image, which is the first image, the region of interest can be displayed with higher real-time property, and an image with a high sense of immersion can be displayed by suppressing the deviation between the position of the real imaging object and the position of the imaging object in the composite image.

In these cases, since the region of interest is changed as needed, an adjustment margin period for corresponding to the change of the region of interest (movement of the region of interest) during the processing of one frame is provided.

Specifically, the adjustment margin periods INT11 and INT12 are provided between the camera exposure timings DS11 and the camera exposure timing DS21 corresponding to one frame of the blur-reduced image and the camera exposure timings DS12 and DS21 before and after that.

Figure 10:
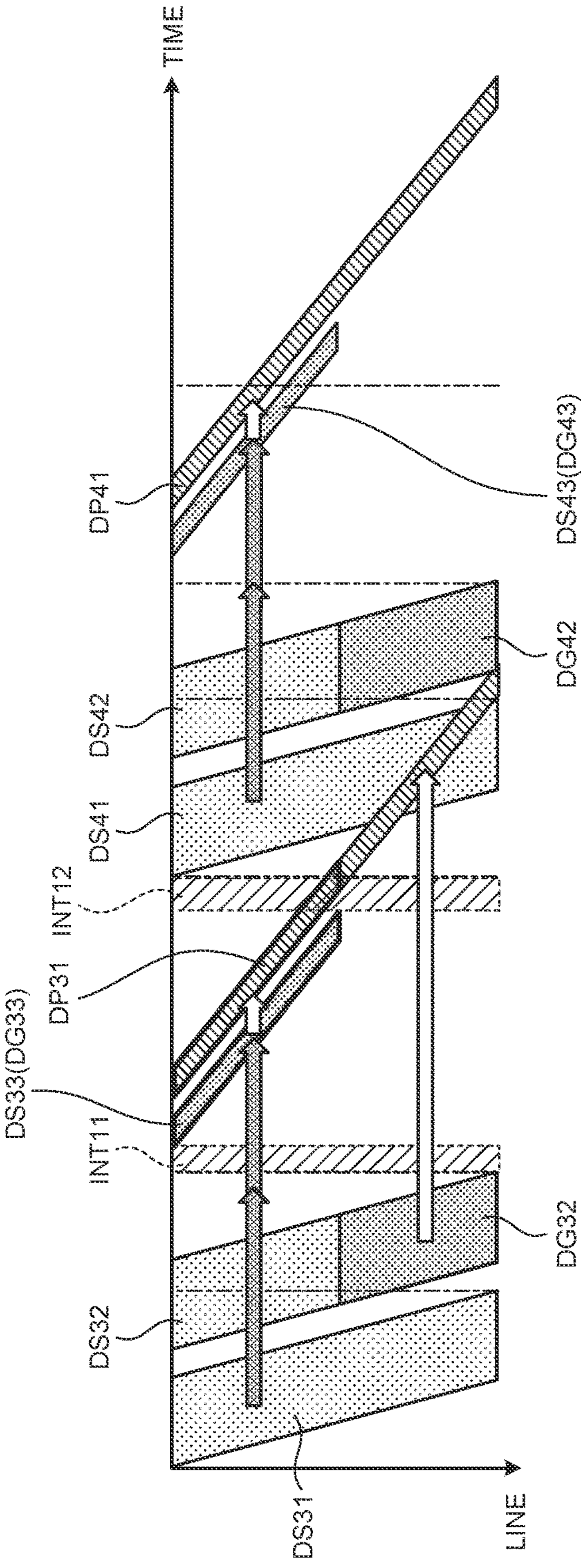
FIG. 10 is another explanatory diagram of imaging timing according to the embodiment.

FIG. 10 is another explanatory diagram of imaging timing according to the embodiment.

FIG. 10 illustrates a case where the region of interest is changed to the upper side of the imaging region as compared with the case of FIG. 8.

In FIG. 10, similarly to FIG. 8, the horizontal axis represents time, and the vertical axis represents a line.

FIG. 10 is same in that, during a processing period of one frame, there is two imaging timings of a binning image that can be used as an image of a region other than the region of interest and has a low resolution but can be imaged with a high S/N ratio and a high dynamic, but is different in that the region of interest is on the upper side of the imaging region.

As illustrated in FIG. 10, at displaying timing DP31, since the display timing of the displayed region of interest is immediately after the start of the displaying, an imaging data group acquired at camera exposure timing DS31, an imaging data group acquired at camera exposure timing DS32, and an imaging data group DG33 acquired at the camera exposure timing DS33 are combined and displayed.

After the end of the display of the region of interest at the displaying timing DP31, display is performed by an imaging data group DG32 acquired at the camera exposure timing DS32.

Then, at displaying timing DP41, when the display timing of the displayed region of interest is reached, imaging data groups of three images corresponding to an imaging data group DG43 acquired at camera exposure timing DS43 corresponding to the region of interest, an imaging data group acquired at camera exposure timing DS41, and an imaging data group DG42 acquired corresponding to camera exposure timing DS42 are combined and displayed.

Also in this case, image correction is performed in a manner that the image quality of the captured image of the region of interest and the image quality of the captured image outside the region of interest do not have a feeling of strangeness, and then combining is performed.

As described above, even when the region of interest is changed, the processing start timing is only changed, and the processing content is always the same, in a manner that image display can be reliably performed.

Next, a timing control method when the region of interest is changed will be described with reference to a flowchart.

Figure 11:
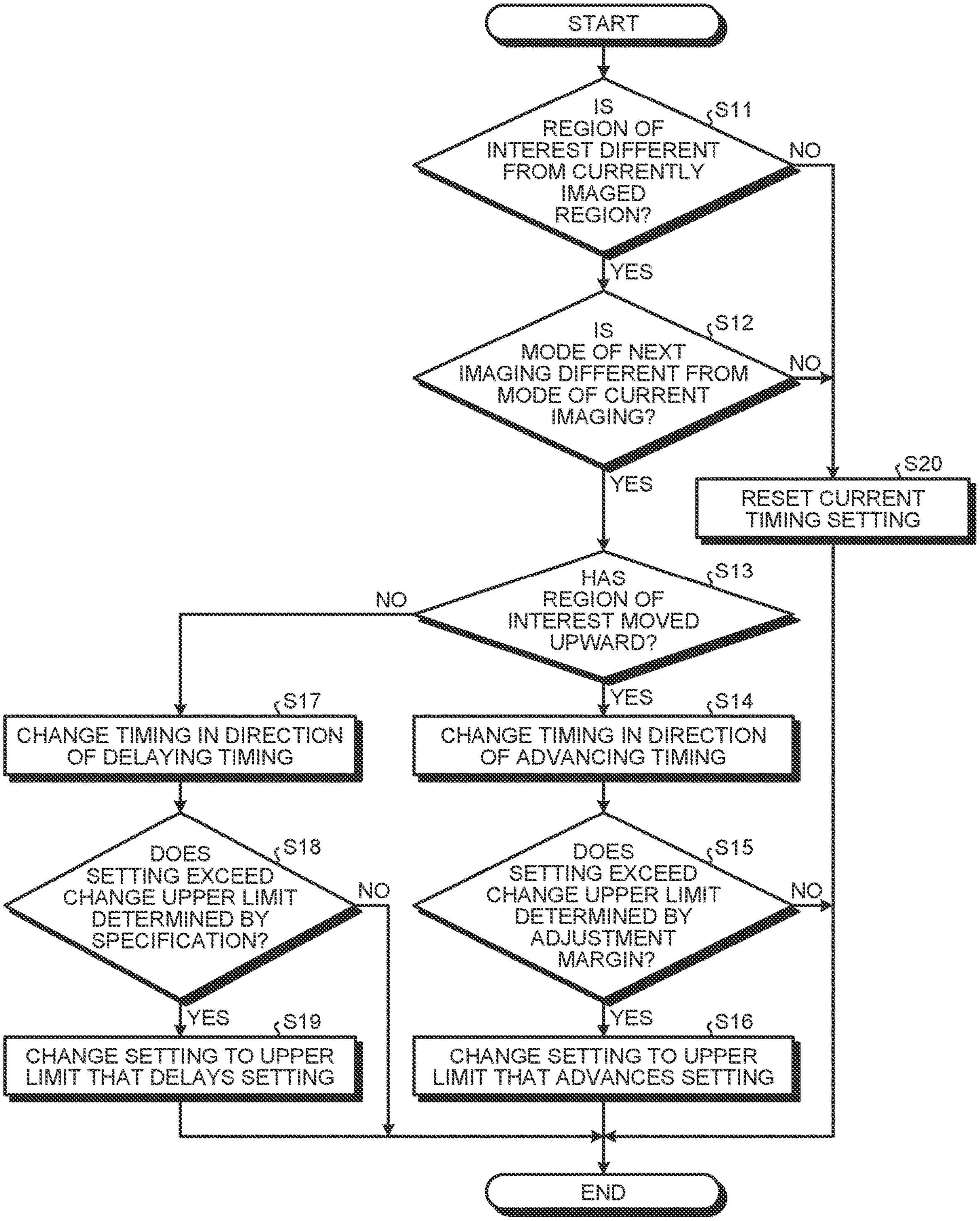
FIG. 11 is a processing flowchart of imaging timing control of a camera.

FIG. 11 is a processing flowchart of imaging timing control of a camera.

First, when the setting change timing comes, it is determined whether or not the previous (one frame before) region of interest is different from the currently imaged region of interest (step S11).

In this case, the fact that the previous region of interest is different from the currently imaged region of interest does not mean to exclude the case of completely coinciding physically, but means a case where the previous region of interest is different to such an extent that it can be recognized that the user's line of sight has been changed.

In the determination in step S11, in a case where the previous region of interest is the same as the currently imaged region of interest (step S11; No), the processing proceeds to step S20.

In the determination in step S11, in a case where the region of interest is different from the current photographed area (step S11; Yes), it is determined whether or not the next imaging mode is different from the current imaging mode (step S12).

Here, the mode is either a mode in which imaging is performed by the binning processing or a mode in which imaging is performed only in the region of interest.

In the determination in step S12, in a case where the next imaging mode is different from the current imaging mode (step S12; Yes), it is determined whether or not the region of interest has moved upward (step S13).

In the determination in step S13, in a case where the region of interest has moved upward (step S13; Yes), the timing is changed in the direction of advancing the imaging timing of the camera in the timing setting (step S14).

Then, it is determined whether or not the changed setting exceeds the change upper limit in the direction of advancing the timing determined by the adjustment margin period (adjustment margin periods INT11 and INT12 in the present embodiment) (step S15). That is, it is determined whether or not the change upper limit falls within the adjustment margin period.

In the determination in step S15, in a case where the changed setting exceeds the change upper limit determined by the adjustment margin (step S15; Yes), the change upper limit value in the direction of advancing the changed setting is set, and the processing ends (step S16).

In the determination in step S15, in a case where the changed setting does not exceed the change upper limit in the direction of advancing the setting determined by the adjustment margin (step S15; No), the changed setting is validated, and the processing ends.

In the determination in step S13, in a case where the region of interest has not moved upward (step S13; Yes), the timing is set in the direction of delaying the timing in the timing setting (step S17).

Then, it is determined whether or not the changed setting exceeds the change upper limit for delaying the setting determined by the adjustment margin (step S18).

In the determination in step S18, in a case where the changed setting exceeds the change upper limit in the direction of delaying determined by the adjustment margin (step S18; Yes), the change upper limit value in the direction of delaying the changed setting is set, and the processing ends (step S19).

In the determination in step S18, in a case where the changed setting does not exceed the change upper limit in the direction of delaying the setting determined by the adjustment margin (step S19; No), the changed setting is validated, and the processing ends.

As described above, according to the present embodiment, it is possible to realize reduction of blur and high definition with low delay while reducing the processing load on image processing.

Figure 12:
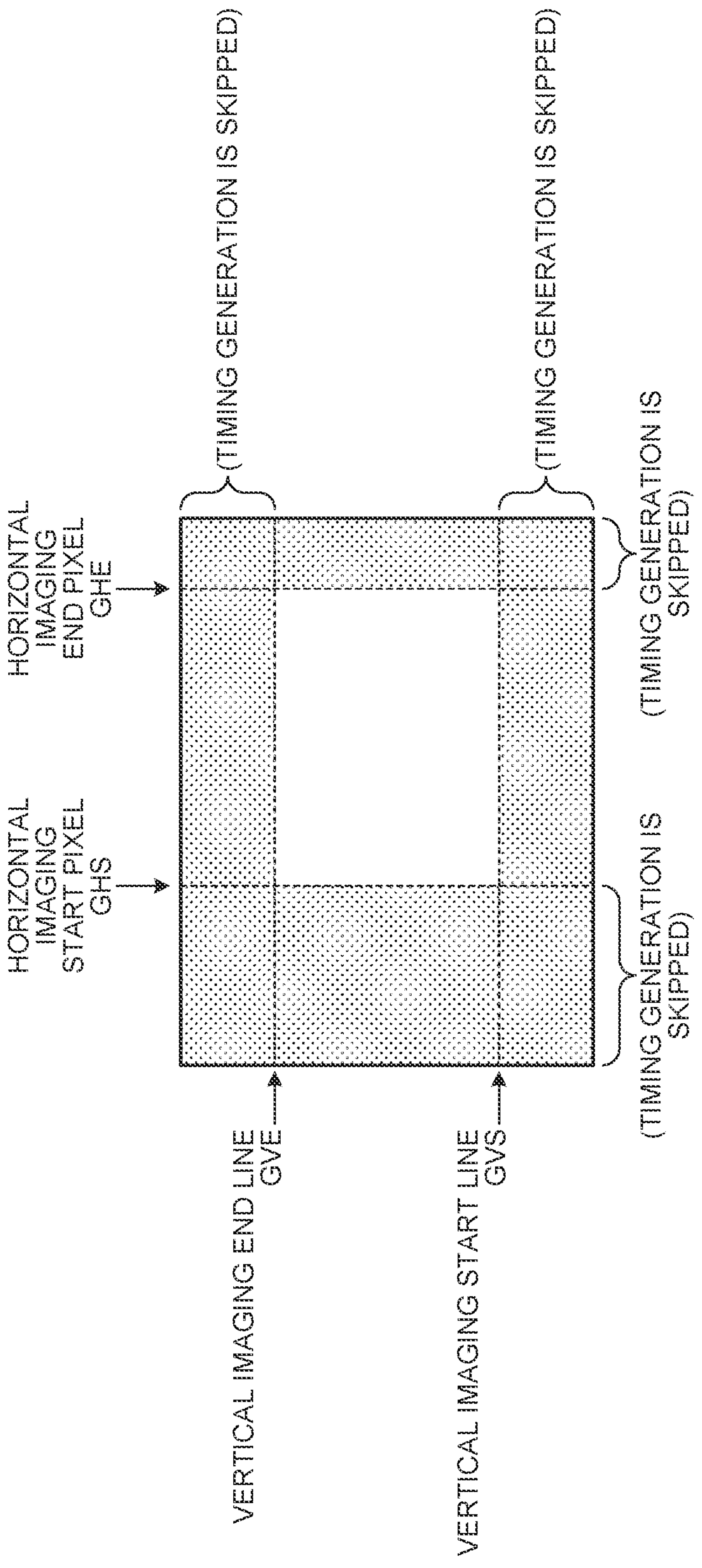
FIG. 12 is an explanatory diagram of processing at a time of acquiring a blur-reduced image.

FIG. 12 is an explanatory diagram of processing at a time of acquiring a blur-reduced image.

In the above description, the processing at the time of acquiring the blur-reduced image has not been described in detail, but in the case of acquiring the blur-reduced image of the region of interest, the following procedure is performed.

The image processing system 50 sets a horizontal imaging start pixel GHS, a flat imaging end pixel GHE, a vertical imaging start line GVS, and a vertical imaging end line GVE to the timing control unit 44. Then, during the imaging operation, the imaging timing generation outside the region of interest is skipped.

Therefore, according to the present embodiment, since the image output is not performed for the skipped amount, it is possible to acquire an image of only a necessary region of interest and end the image data transfer earlier by the skipped amount in the vertical direction.

[6] Modification of Embodiment

Note that the embodiments of the present technology are not limited to the above-described embodiments, and various modifications can be made without departing from the gist of the present technology.

In the above description, one blur-reduced image is captured and combined with one or two binning images. However, a similar effect can be obtained by capturing one or a plurality of binning images with respect to a plurality of blur-reduced images and combining the images. Furthermore, the present technology can have the following configurations.

(1)

An image processing device comprising:

when generating a composite image obtained by combining a first image captured in a first exposure time and a second image that is an image corresponding to a partial region of the first image and is captured in a second exposure time shorter than the first exposure time, the first image and the second image being input from an image sensor, a control unit that sets imaging timing of the second image to timing closer to timing of outputting the composite image to a display device than imaging timing of the first image.

(2)

The image processing device according to (1), wherein resolution of the first image is first resolution, and resolution of the second image is second resolution higher than the first resolution.

(3)

The image processing device according to (1) or (2), wherein a predetermined region of interest is displayed by the composite image, and a region other than the region of interest is displayed based on the first image.

(4)

The image processing device according to (3), wherein a plurality of the first images having different camera exposure timings are acquired and held, and when the region other than the region of interest is displayed based on the first image, display is performed using any one of the first images in which a time from the camera exposure timing to the timing of output to the display device is relatively short among the plurality of first images.

(5)

The image processing device according to (3) or (4), wherein the control unit sets a timing adjustment margin for absorbing a fluctuation in imaging timing accompanying a change in the region of interest before and after the imaging timing of the second image, and sets the imaging timing of the first image at timing other than the timing adjustment margin and the imaging timing of the second image.

(6)

The image processing device according to any one of (1) to (5), wherein the first image is a binning image, and the second image is a blur-reduced image in which the second exposure time is set for a purpose of blur reduction.

(7)

The image processing device according to any one of (1) to (6), wherein the control unit generates the composite image and outputs the composite image to the display device in real time.

(8)

An image display system comprising:

an imaging device that includes an image sensor and outputs a first image captured in a first exposure time and having first resolution and a second image that is an image corresponding to a partial region of the first image and is captured in a second exposure time shorter than the first exposure time and having second resolution higher than the first resolution;

an image processing device including a control unit that generates and outputs a composite image obtained by combining the first image and the second image; and a display device that displays the input composite image.

(9)

The image display system according to (8), wherein the imaging device is worn by a user, the image display system includes a line-of-sight direction detection device that detects a line-of-sight direction of the user, and the region of interest is set based on the line-of-sight direction.

(10)

A method executed by an image processing device that controls an image sensor, the method comprising:

a process of inputting, from the image sensor, a first image captured in a first exposure time and a second image that is an image corresponding to a partial region of the first image and is captured in a second exposure time shorter than the first exposure time;

a process of generating a composite image obtained by combining the first image and the second image; and a process of setting an imaging timing of the second image to timing closer to timing of outputting the composite image to a display device than imaging timing of the first image.

(11)

A program for controlling an image processing device that controls an image sensor by a computer, the program for causing the computer to function as:

means for inputting, from the image sensor, a first image captured in a first exposure time and a second image that is an image corresponding to a partial region of the first image and is captured in a second exposure time shorter than the first exposure time;

means for generating a composite image obtained by combining the first image and the second image; and means for setting an imaging timing of the second image to timing closer to timing of outputting the composite image to a display device than imaging timing of the first image.

REFERENCE SIGNS LIST

10 VR HEAD MOUNTED DISPLAY SYSTEM (IMAGE DISPLAY SYSTEM)
11 HEAD MOUNTED DISPLAY (HMD UNIT)
12 INFORMATION PROCESSING DEVICE (PC UNIT)
21 IMU
22 SLAM CAMERA
23 VST CAMERA
23A IMAGE SENSOR
24 EYE TRACKING CAMERA
25 DISPLAY
31 SELF-POSITION ESTIMATION UNIT
32 REGION-OF-INTEREST DETERMINATION UNIT
33 ISP
34 COMPENSATION UNIT
35 FRAME MEMORY
36 IMAGE COMPOSITION UNIT

The invention claimed is:

1. An image processing device comprising:

circuitry configured to acquire at least one first image, and set, when generating a composite image obtained by combining a selected first image captured in a first exposure time and a second image that includes an image corresponding to a partial region of the at least one first image and is captured in a second exposure time shorter than the first exposure time, the at least one first image and the second image being input from an image sensor, imaging timing of the second image to timing closer to timing of outputting the composite image to a display device than imaging timing of the at least one first image, wherein the selected first image is selected according to whether the partial region includes a predetermined region of interest.

2. The image processing device according to claim 1, wherein resolution of the first image is first resolution, and resolution of the second image is second resolution higher than the first resolution.

3. The image processing device according to claim 1, wherein the predetermined region of interest is displayed by the composite image, and a region other than the region of interest is displayed based on the first image.

4. The image processing device according to claim 3, wherein a plurality of the first images having different camera exposure timings are acquired and held, and when the region other than the region of interest is displayed based on the first image, display is performed using any one of the first images in which a time from the camera exposure timing to the timing of output to the display device is relatively short among the plurality of first images.

5. The image processing device according to claim 3, wherein the control unit sets a timing adjustment margin for absorbing a fluctuation in imaging timing accompanying a change in the region of interest before and after the imaging timing of the second image, and sets the imaging timing of the first image at timing other than the timing adjustment margin and the imaging timing of the second image.

6. The image processing device according to claim 1, wherein the first image is a binning image, and the second image is a blur-reduced image in which the second exposure time is set for a purpose of blur reduction.

7. The image processing device according to claim 1, wherein the control unit generates the composite image and outputs the composite image to the display device in real time.

8. An image display system comprising:

an imaging device that includes an image sensor, wherein the imaging device is configured to output at least one first image captured in a first exposure time and having first resolution and a second image that includes an image corresponding to a partial region of the at least one first image and is captured in a second exposure time shorter than the first exposure time and having second resolution higher than the first resolution;

an image processing device including circuitry configured to generate and output a composite image obtained by combining a selected first image and the second image; and a display device configured to display the input composite image, wherein the selected first image is selected according to whether the partial region includes a predetermined region of interest.

9. The image display system according to claim 8, wherein the imaging device is configured to be worn by a user, the image display system includes a line-of-sight direction detection device that is configured to detect a line-of-sight direction of the user, and the region of interest is set based on the line-of-sight direction.

10. A method executed by an image processing device that controls an image sensor, the method comprising:

inputting, from the image sensor, at least one first image captured in a first exposure time and a second image that includes an image corresponding to a partial region of the at least one first image and is captured in a second exposure time shorter than the first exposure time;

generating a composite image obtained by combining a selected first image and the second image; and setting an imaging timing of the second image to timing closer to timing of outputting the composite image to a display device than imaging timing of the first image, wherein the selected first image is selected according to whether the partial region includes a predetermined region of interest.

11. A non-transitory computer-readable storage medium having embodied thereon a program, which when executed by an image processing device that controls an image sensor by a computer, causes the computer to execute a method, the method comprising:

inputting, from the image sensor, at least one first image captured in a first exposure time and a second image that includes an image corresponding to a partial region of the at least one first image and is captured in a second exposure time shorter than the first exposure time;

generating a composite image obtained by combining a selected first image and the second image; and setting an imaging timing of the second image to timing closer to timing of outputting the composite image to a display device than imaging timing of the first image, wherein the selected first image is selected according to whether the partial region includes a predetermined region of interest.

* * * * *